(12) United States Patent
Kopp et al.

(10) Patent No.: US 10,060,515 B2
(45) Date of Patent: Aug. 28, 2018

(54) LINEAR DRIVE AND METHOD FOR THE PRODUCTION THEREOF

(71) Applicant: FESTO AG & Co. KG, Esslingen (DE)

(72) Inventors: Simone Kopp, Esslingen (DE); Ulrich Diener, Esslingen (DE); Eric Angue, Kornwestheim (DE)

(73) Assignee: FESTO AG & CO. KG, Esslingen (DE)

( * ) Notice: Subject to any disclaimer, the term of this patent is extended or adjusted under 35 U.S.C. 154(b) by 322 days.

(21) Appl. No.: 14/900,857

(22) PCT Filed: Jun. 28, 2013

(86) PCT No.: PCT/EP2013/001897
§ 371 (c)(1),
(2) Date: Dec. 22, 2015

(87) PCT Pub. No.: WO2014/206429
PCT Pub. Date: Dec. 31, 2014

(65) Prior Publication Data
US 2016/0160966 A1   Jun. 9, 2016

(51) Int. Cl.
*F16H 21/44* (2006.01)
*F16C 33/58* (2006.01)
*F16C 29/04* (2006.01)
*F16H 21/04* (2006.01)
*F16C 33/64* (2006.01)

(52) U.S. Cl.
CPC .......... *F16H 21/44* (2013.01); *F16C 29/048* (2013.01); *F16C 33/588* (2013.01); *F16H 21/04* (2013.01); *F16C 33/64* (2013.01)

(58) Field of Classification Search
CPC ........ F16H 21/44; F16H 21/04; F16C 29/048; F16C 33/588; F16C 33/64
See application file for complete search history.

(56) References Cited

U.S. PATENT DOCUMENTS

| 4,701,058 A | 10/1987 | Mottate |
| 5,232,288 A * | 8/1993 | Mottate ................ F16C 29/005 384/45 |
| 5,582,487 A * | 12/1996 | Teramachi ........... F16C 29/005 384/45 |

(Continued)

FOREIGN PATENT DOCUMENTS

| CN | 102449333 | 5/2012 |
| DE | 2540656 | 3/1976 |

(Continued)

*Primary Examiner* — Zakaria Elahmadi
(74) *Attorney, Agent, or Firm* — Hoffmann & Baron, LLP

(57) ABSTRACT

A linear drive, which has an output slide, which is guided on a drive housing in a linearly movable manner. The output slide contains a one-piece slide body, which is designed as a bent sheet-metal part. The slide body includes a plate-shaped central segment, guide limbs, which are arranged alongside the plate-shaped central segment and bent downward, and a drive limb, which is arranged at an end face and which likewise is bent downward. The guide limbs are used to linearly guide the output slide, and the drive limb is used for the application of the driving forces that cause the reciprocating motion of the output slide.

25 Claims, 7 Drawing Sheets

(56) References Cited

U.S. PATENT DOCUMENTS

| | | | | |
|---|---|---|---|---|
| 5,829,885 A | * | 11/1998 | Scheich | ............... F16C 29/005 |
| | | | | 384/45 |
| 9,327,615 B2 | * | 5/2016 | Yamada | ............... B60N 2/0705 |
| 2011/0247487 A1 | * | 10/2011 | Ishibashi | ............ F15B 15/1471 |
| | | | | 92/128 |
| 2014/0348447 A1 | * | 11/2014 | Foster | ................ F16C 33/6696 |
| | | | | 384/13 |
| 2015/0252843 A1 | * | 9/2015 | Bachor | ................ F24C 15/168 |
| | | | | 384/18 |
| 2016/0265563 A1 | * | 9/2016 | Angue; Eric | ......... F16C 33/588 |

FOREIGN PATENT DOCUMENTS

| | | | |
|---|---|---|---|
| DE | 3330933 | | 3/1985 |
| DE | 102011016282 | | 12/2011 |
| EP | 2133005 | | 12/2009 |
| JP | 6132621 | | 2/1986 |
| JP | 6237621 | | 3/1987 |
| JP | 4119217 | | 4/1992 |
| JP | 7158610 | | 6/1995 |
| JP | 2002339913 | | 11/2002 |
| JP | 2002374043 | | 12/2002 |
| JP | 2003235660 | | 8/2003 |
| JP | 2003239963 | | 8/2003 |
| JP | 2011107575 | | 6/2011 |
| JP | 2011220403 | | 11/2011 |
| JP | 2011257628 | | 12/2011 |
| JP | 2012219874 | | 11/2012 |
| JP | 2012219874 A | * | 11/2012 ............ F16C 29/045 |

\* cited by examiner

LINEAR DRIVE AND METHOD FOR THE PRODUCTION THEREOF

This application claims priority based on an International Application filed under the Patent Cooperation Treaty, PCT/EP2013/001897, filed Jun. 28, 2013

BACKGROUND OF THE INVENTION

The invention relates to a linear drive comprising a drive unit having a drive housing and comprising an output slide which is located on the outside of the drive housing and guided for linear movement relative thereto to perform a reciprocating movement oriented in the axial direction of a longitudinal axis, wherein the output slide comprises a single-piece slide body having a guide section with a U-shaped cross-section and consisting of a plate-shaped central section and of guide limbs arranged at opposite long sides of the central section and projecting downwards towards the drive housing, and having a drive limb arranged at an end face of the central section and likewise projecting downwards, wherein the guide limbs are used for the linear guidance of the output slide and the drive limb is drive-coupled to at least one drive section of the drive unit, which projects out from the drive housing.

The invention further relates to a method for the production of such a linear drive.

A linear drive of the type referred to above and known from DE 33 30 933 A1 comprises an output slide which is mounted for linear movement on a drive housing of a drive unit and which can be driven by the drive unit to perform a linear reciprocating movement. The output slide comprises a single-piece slide body and receives the actuating force required for performing the reciprocating movement from a piston rod which projects from the drive housing and acts on a downward-projecting drive limb of the slide body. The drive limb is located at an end face of a plate-shaped central section of the slide body, which at the same time forms a part of a guide section and for this purpose has two guide limbs arranged alongside and projecting downwards, which cooperate with the drive housing for the linear guidance of the output slide by way of a roller bearing device. The drawing in DE 33 30 933 A1 shows that the single-piece slide body has been produced from a material blank by machining, which is very time-consuming, so that the production of the known linear drive is likely to involve high costs.

From DE 10 2011 016 282 A1, a linear drive is known to have an output slide with a multi-part slide body, which comprises a single-piece guide section referred to as sliding table and an end plate separately mounted thereon and connected to at least one piston rod for power transmission. The production costs of this linear drive can be reduced by press-forming. However, the assembly of this linear drive involves precise operations in order to ensure a low-friction operation, which has a negative effect on production costs.

SUMMARY OF THE INVENTION

The invention is based on the problem of taking measures which would facilitate a particularly simple and cost-effective production of a linear drive.

To solve this problem, it is provided by the invention that, in a linear drive of the type referred to above, the single-piece slide body is a bent sheet metal part, wherein both the guide limbs and the drive limb are represented by sections of the slide body which are bent relative to the central section.

In addition, in combination with the method features referred to above, the problem is solved by providing that the single-piece slide body is produced as a bent sheet metal part based on a sheet metal blank which has previously been suitably contoured at the edges.

The configuration of the slide body as a single-piece bent sheet metal part which comprises, in addition to the central section, at least the two guide limbs and the drive limb offers the opportunity of a technologically simple and cost-effective production of the output slide. On the one hand, complex machining processes are avoided, and on the other hand, there is no need for joining operations, which involve a considerable expenditure of time if adequate precision is to be ensured. The production of the slide body is preferably based on a plate-shaped sheet metal blank which has external contours matching the intended final shape of the slide body and which is in particular trimmed accordingly—for example by laser cutting or by stamping—and then shaped or bent, using suitable bending tools, in such a way that the result is a slide body in the intended final shape with a plate-shaped central section and limbs including at least the drive limb and the two guide limbs projecting from the central section.

Advantageous further developments of the invention can be derived from the dependent claims.

Each of the two guide limbs is expediently provided with a linear guide groove with which engages a guide element supporting the output slide relative to the drive housing and effecting a linear guidance. In a preferred embodiment, each guide groove is assigned a plurality of guide elements, which are rolling elements in particular, for example in the form of balls, rollers or needles. In this way, a particularly smooth and at the same very precise linear guidance which is capable of bearing high loads can be ensured.

In the context of a slide body represented by a bent sheet metal part, it is advantageous if the two guide limbs are in themselves immediately bent in such a way that they have a correspondingly non-linear cross-sectional contour which defines the assigned guide groove. Each guide limb can in particular, if viewed in cross-section, have an offset and rounded shape by which the assigned guide groove is defined.

It is considered to be particularly advantageous if the at least one guide groove is located on the outside of the respective guide limb remote from the other guide limb. In this way, any mechanical reworking of the surface of the guide grooves which may be required can be carried out easily after the bending of the slide body, because the guide grooves are easily accessible along their entire length.

The bending processes are particularly simple if the drive limb is separated from both guide limbs at the edges and the central section provides the only connection between the various limbs. After the completion of the slide body, this is in particular indicated by a separation slot between the drive limb and each guide limb, which is open on the underside opposite the central section. The limbs are preferably designed such that they are not in contact with one another in the region of the separation slot, but have at least a slight distance from one another, so that a free space extends between them. Such a free space in particular takes account of the fact that the metal usually springs back slightly after the bending process owing to its elasticity, so that the free space can be used for bending the limbs in the forming process more than necessary, allowing them to return elastically to the desired position afterwards.

The forming process is moreover also facilitated if the central section has in each of its two corner regions, in which the drive limb is adjacent to the two guide limbs, a recess designed in the manner of a notch. This recess is open both towards the long side and towards the end face of the central section.

In a preferred configuration, the drive limb itself is in itself bent to a U-shape, having, starting from the central section of the slide body, a downward-projecting first limb section adjoined by a second limb section bent back by about 180 degrees and projecting upwards. In this way, a drive limb of a particularly high stability can be generated. It is expedient to bend the two limb sections in such a way that the second limb section forms an inner limb section closer to the guide section, while the outer end of the slide body is defined by the downward-projecting first limb section, which can be described as the outer limb section. This configuration also results in a surface which is closed towards the outside, lowering the risk of ingress of impurities between the two limb sections. In principle, however, the bend can be designed such that the upward-projecting second limb section lies on the outside.

The U-shaped configuration of the drive limb can further be used to advantage for the mechanical coupling of the drive section of the drive unit, which transmits to the output slide the driving force required for initiating the reciprocating movement. In this context, it is in particular provided that each of the two limb sections has a mounting hole passing through it, the mounting holes being coaxial with each other, the outer mounting hole formed in the outer limb section having a larger diameter than the inner mounting hole formed in the inner limb section. From the outside, a mounting screw extends through both mounting holes, its screw head lying within the outer mounting hole and being supported on the inner limb section. The distance between the two limb sections is in particular chosen such that the screw head does not projects beyond the outer surface of the outer limb section, but ends within the outer mounting hole, being preferably flush with the outer surface of the outer limb section.

A further preferred configuration of the linear drive provides that the single-piece slide body has, on the end face of the central section opposite the drive limb, a further limb, which projects downwards from the central section in the same direction as the other limbs and which is described as a stop limb on the basis of its application and is likewise implemented in the form of a section of the slide body which is bent relative to the central section. Like the drive limb and the two guide limbs, the stop limb can be produced in a bending process when producing the bent sheet metal part. The stop limb can be used as a stoke limiting device for the output slide and can in particular cooperate directly or indirectly with a mating stop mounted in a stationary position relative to the drive housing.

Concerning the existence of separation slots and recesses between the stop limb and each guide limb, the descriptions provided above for corresponding measures in connection with the guide limbs and the drive limb apply.

The stop limb preferably supports a stroke limiting element which can cooperate with a mating stop located on the drive housing for limiting the reciprocating movement. The stroke limiting element can be provided with impact damping means for damping the impact on the mating stop, and these impact damping means may, for example, comprise an elastic buffer element, or they may be implemented in the form of a fluidic shock absorber.

The stop limb is preferably bent to a U-shape as explained above in the context of the drive limb, with the advantages of the drive limb applying here as well.

Combined with the location of a stroke limiting element, the U-shape of the stop limb offers particular advantages. For example, the two limb sections of the drive limb can each have a threaded mounting hole with a female thread, the threaded mounting holes being aligned to each other, and into the two threaded mounting holes a stroke limiting element having a male thread can be or is tightened for limiting the reciprocating movement of the output slide, so that it extends through the two threaded mounting holes at the same time. At least one additional spreading element allows the two limb sections to be spread apart slightly by introducing a suitable force in such a way that the male thread of the stroke limiting element is clamped to the female thread of the two threaded mounting holes, resulting in a non-positive anti-rotation device for the stroke limiting element, which prevents an undesirable change of the set stop position.

The spreading element is a spreading screw in particular, which can be tightened into a threaded hole of the one limb section separate from the mounting holes and which can be clamped against an opposite surface section of the other limb section in order to generate the desired spreading force.

The slide body is preferably made of sheet steel. The use of a stainless steel sheet offers particularly good corrosion resistance.

BRIEF DESCRIPTION OF THE DRAWINGS

The invention is explained in greater detail below with reference to the accompanying drawing, of which.

DETAILED DESCRIPTION OF THE PREFERRED EMBODIMENTS

Figure 1:
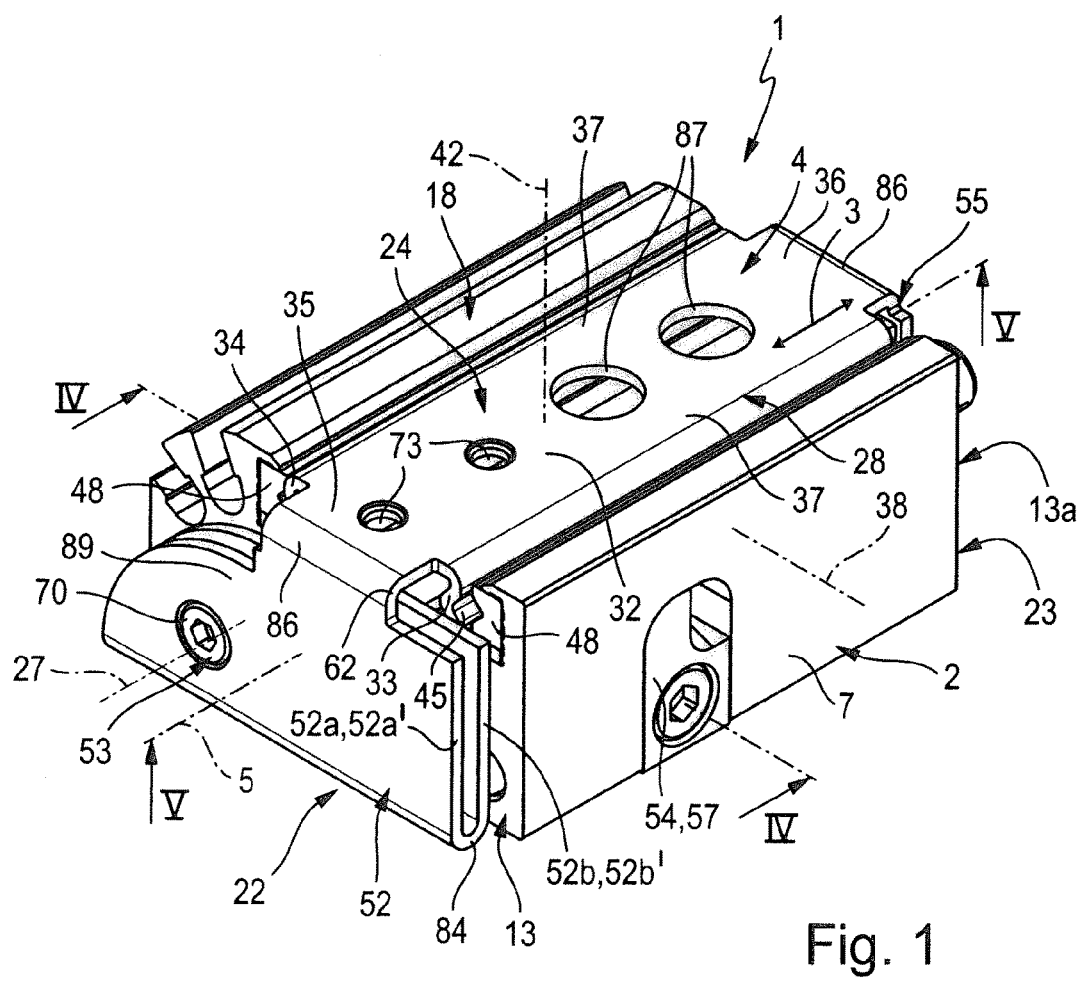
FIG. 1 is an isometric representation of a preferred first embodiment of the linear drive according to the invention, with a view on the side of the drive limb.
Figure 2:
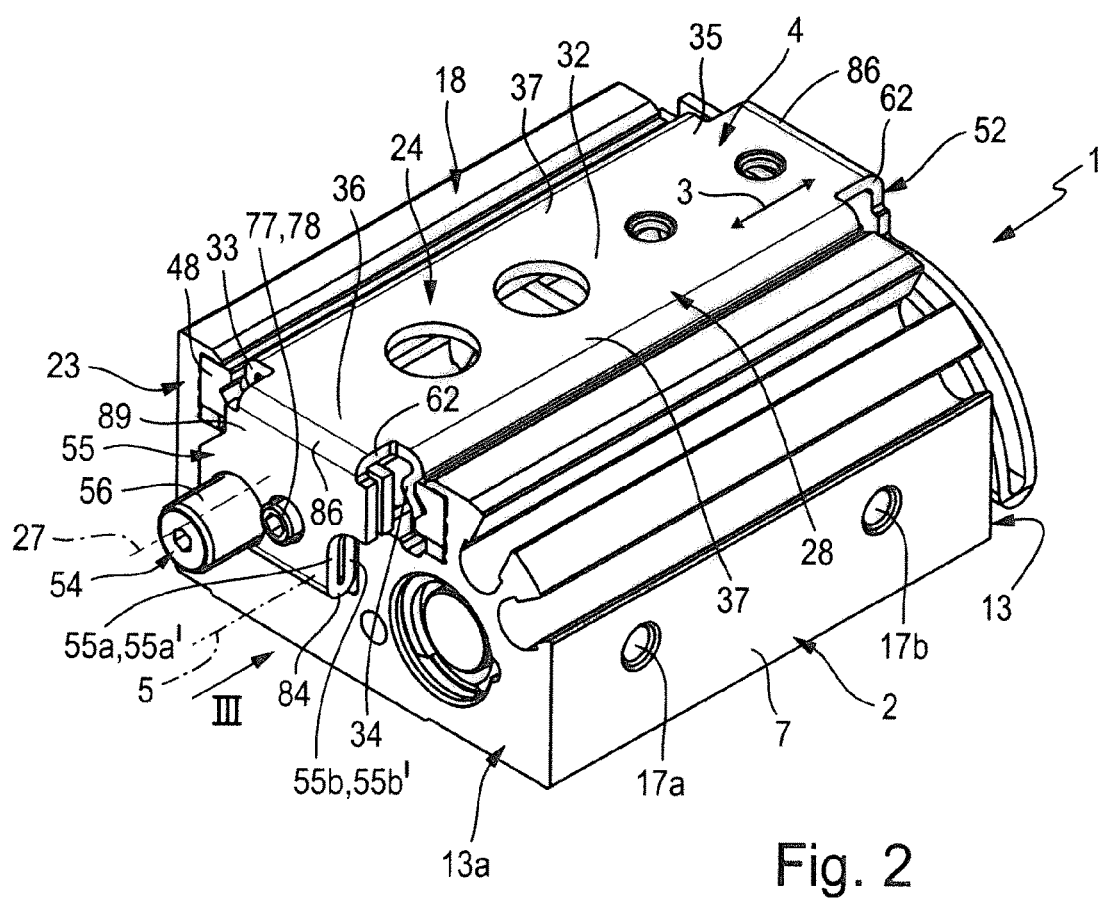
FIG. 2 is a further isometric representation of the linear drive in the direction opposite to that of FIG. 1.

The drawing shows a linear drive identified as a whole by the reference number 1, which comprises a drive unit 2 and an output slide 4 mounted thereon for linear displacement to perform a linear reciprocating movement 3.

The linear drive 1 has a longitudinal axis 5, the reciprocating movement 3 being oriented in the axial direction of this longitudinal axis 5. The output slide 4 can move in opposite directions relative to the drive unit 2.

The output slide 4 is located on the outside of the drive unit 2. Linear guide means identified as a whole by the reference number 6 ensure that the output slide 4 is supported relative to the drive unit 2 at right angles to the longitudinal axis 5 and guided for linear displacement to perform the linear reciprocating movement 3.

The drive unit 2 comprises a housing identified as drive housing 7 and drive means 8, which are at least partially accommodated within the drive housing 7 and which are coupled to the output slide 4 for the transmission of driving forces. A drive section 12 of the drive means 8, which is capable of a driving movement 14 in the axial direction of the longitudinal axis 5 as indicated by a double-headed arrow, projects at a front end face 13 from the drive housing 7 and is drive-connected to the output slide 4 outside the drive housing 7.

The drive section 12 is preferably rod-shaped in design. For this reason, it could be described as drive rod. In the illustrated embodiment, it is represented by a piston rod joined to a drive piston 15, which is capable of linear movement under fluid pressure and accommodated in a drive chamber 16 formed in the interior of the drive housing 7 in a linearly displaceable manner.

The drive piston 15 divides the drive chamber 16 into two sub-chambers 16a, 16b, each of which communicates with one of two control passages 17a, 17b, which terminate towards an outer surface of the drive housing 7. Through the control passages 17a, 17b, a controlled application of fluid pressure to the two sub-chambers 16a, 16b is possible, in order to cause a linear movement of the drive piston 15, from which the driving movement 14 results.

In the illustrated embodiment, the drive means 8 are of the type actuated by fluid power. As an alternative, the drive means 8 may be actuated electrically or by a combination of electric and fluid power. The drive section 12 may, for example, be a drive rod driven electrically via screw actuator.

The output slide 4 extends along a top side 18 of the drive housing 7. At least in a retracted home position shown in the drawing, the output slide 4 preferably extends along the entire length of the drive housing 7.

The output slide 4 has a front side 22 assigned to the front end face 13 of the drive housing 7 and a rear side 23 located opposite in the axial direction of the longitudinal axis 5. Power is transmitted from the drive section 12 to the output slide 4 in the region of the front side 22.

Figure 7:
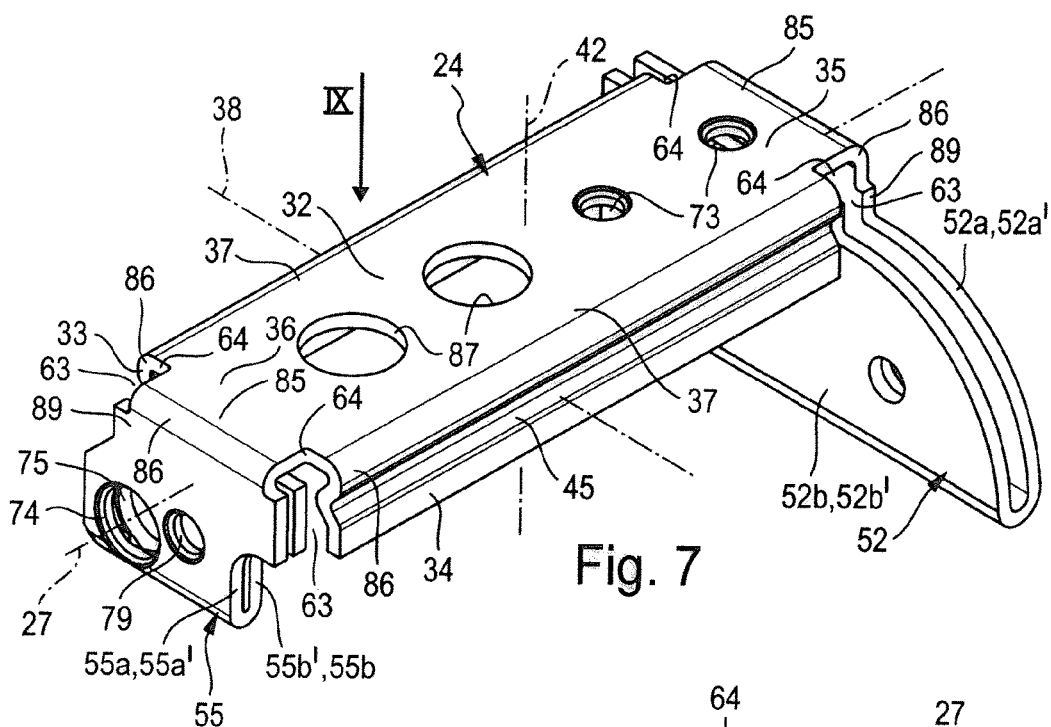
FIG. 7 is a perspective detailed view of the slide body of the linear drive, which is implemented as a single-piece bent sheet metal part.
Figure 8:
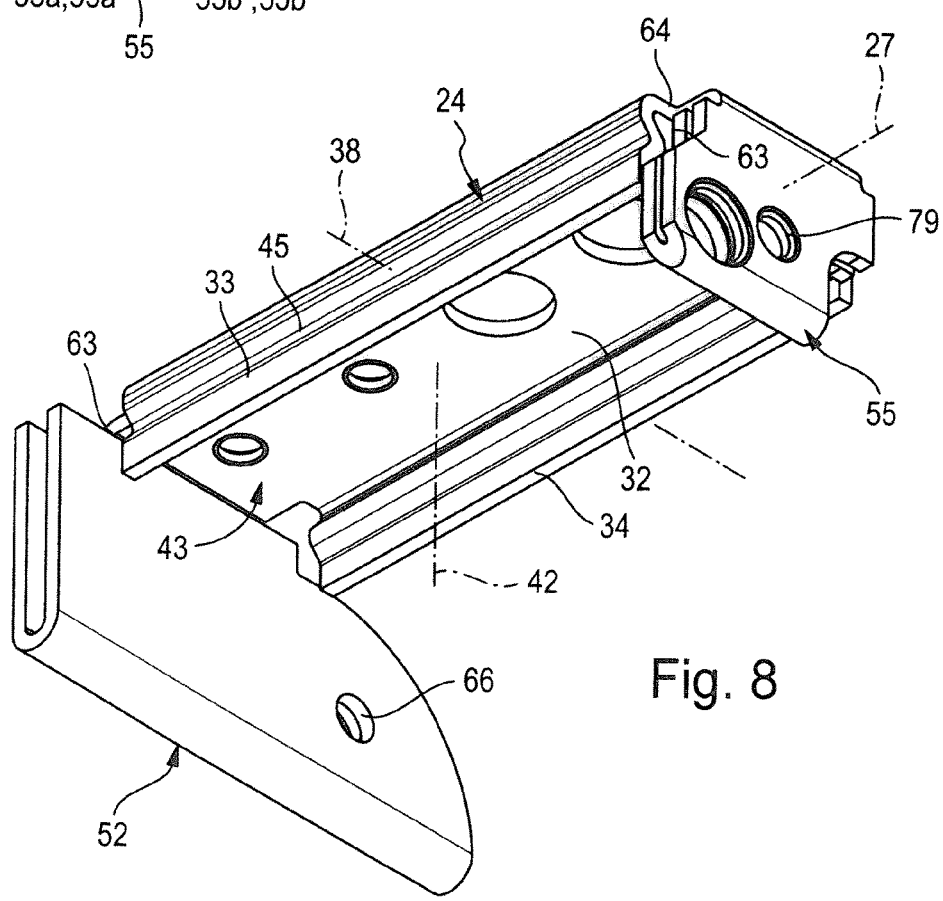
FIG. 8 is an isometric bottom view of the slide body from FIG. 7.

The main component of the output slide 4 is a single-piece slide body 24 made of metal and in particular of steel. This slide body 24 is shown on its own in FIGS. 7 to 9. In its concrete form, the slide body 24 is a sheet metal body made of a sheet metal, in particular sheet steel. A particular advantage results from the fact that the slide body 24 is a bent sheet metal part, i.e. a body produced by bending from previously provided sheet metal blanks.

Figure 9:
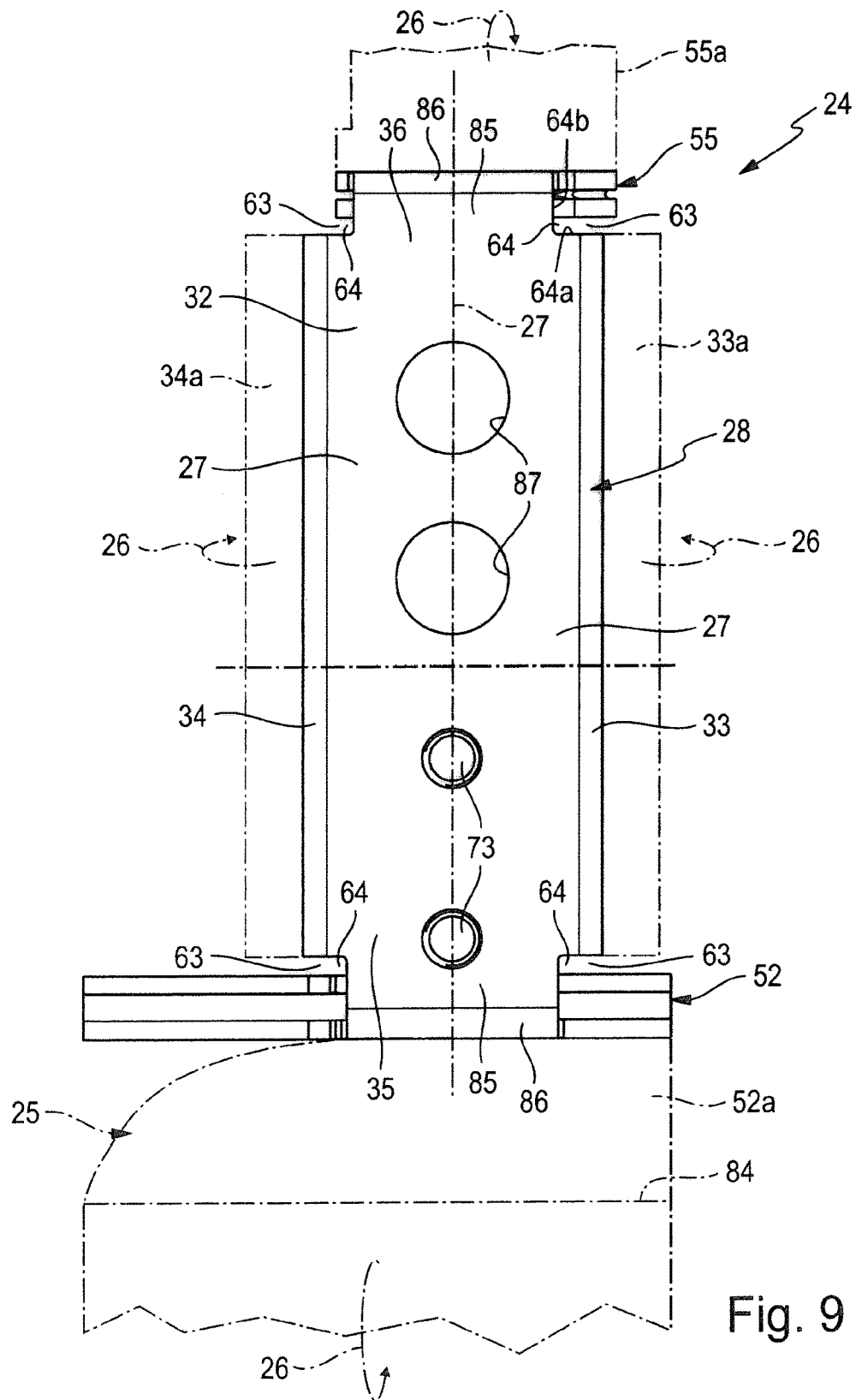
FIG. 9 is a top view of the slide body in the direction indicated by arrow IX from FIG. 7, wherein the eternal contour of a sheet metal blank to be formed by bending is indicated by dot-dash lines and the bending process is indicated diagrammatically by dot-dash arrows.

FIG. 9 indicates by dot-dash lines a sheet metal blank 25 on which the slide body 24 is based. This is converted by bending, using one or more suitable bending tools, into the desired final shape of the slide body 24, which is indicated by various arrows 26. Prior to the bending process, the edges of the sheet metal blank are suitably contoured, in particular trimmed, a process carried out by laser cutting in view of the flexibility of the material, but a stamping process can be used as well.

The slide body 24 has a longitudinal dimension with a longitudinal axis 27 oriented in the same direction as the longitudinal axis 5 of the linear drive 1.

Figure 3:
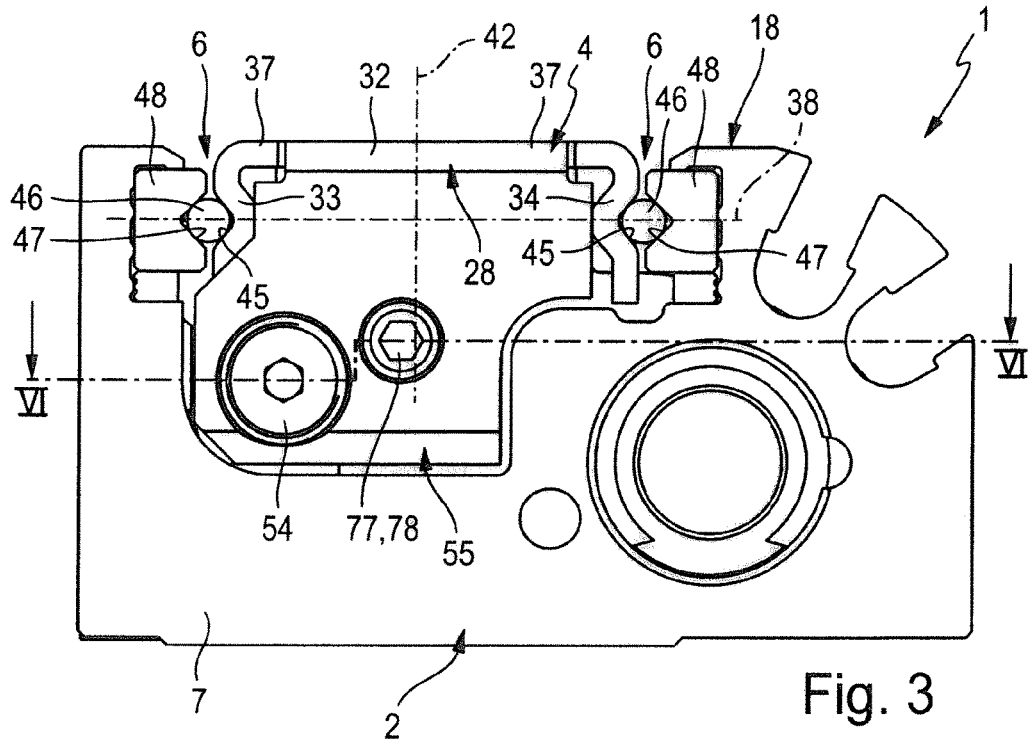
FIG. 3 is an end view of the linear drive in the direction indicated by arrow III from FIG. 2.
Figure 4:
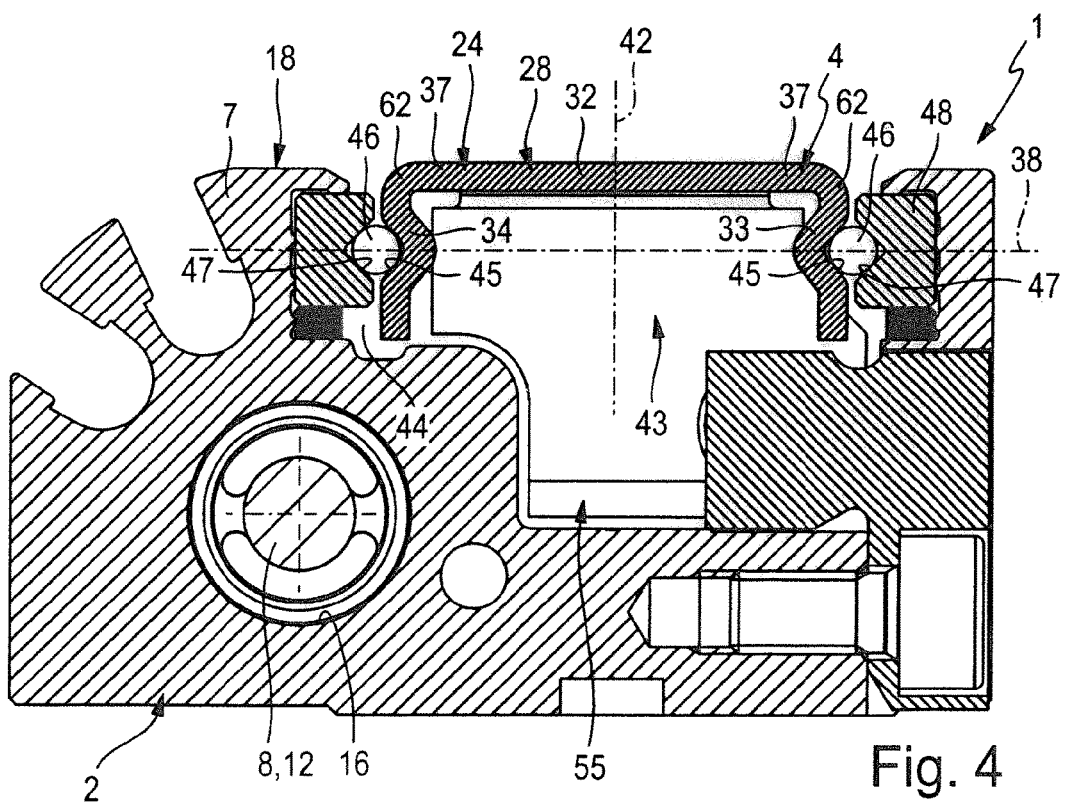
FIG. 4 is a cross-section through the linear drive along line of cut IV-IV from FIG. 1.

The slide body 24 comprises a guide section 28, which extends in the axial direction of the longitudinal axis 27 and has a U-shaped cross-section, which can be seen in FIGS. 3 and 4 in particular. This guide section 28 consists of a plate-shaped central section 32 and two guide limbs 33, 34 integrated therewith. The central section 32 has a front end face 35 oriented in the axial direction of the longitudinal axis 27 and an oppositely oriented rear end face 36. It further comprises two long sides 37 oriented perpendicular thereto, with one of the two guide limbs 33, 34 being formed integrally with each of these long sides 37.

The slide body 24 has a transverse axis 38, which is perpendicular to the longitudinal axis 27. The two guide limbs 33, 34 are arranged at a distance from one another in the axial direction of the transverse axis 38, each extending in the axial direction of the longitudinal axis 27.

The slide body 24 further has a vertical axis 42, which is perpendicular to the longitudinal axis 27 and to the transverse axis 38. With its underside, which is oriented in the axial direction of the vertical axis 42, leading, it is fitted to the top 18 of the drive housing 7, wherein the guide section 28 is expediently recessed into a groove-like guide recess 44 of the drive housing 7, which extends in the axial direction of the longitudinal axis 5 along the entire length of the drive housing 7 and is open both towards the front end face 13 and towards the opposite rear end face 13a of the drive housing 7.

Starting from the central section 12, the guide limbs 33, 34 extend downwards towards the drive housing 7 in the axial direction of the vertical axis 42. In other words, the U-opening of the guide section 28 with its U-shaped cross-section is oriented downwards and faces the top side 18 of the drive housing 7.

The guide limbs 33, 34 are preferably rail- or strip-shaped, their longitudinal dimension extending in the axial direction of the longitudinal axis 27.

Each guide limb 33, 34 is a part of the linear guide means 6 and has, on the outside which faces away from the other guide limb 34, 33 in the axial direction of the transverse axis 38, at least one and preferably precisely one guide groove 45. The guide groove 45 has a linear dimension in the axial direction of the longitudinal axis 27 and preferably a concavely rounded contour.

At least one guide element and preferably several guide elements 46, the other side of which is supported on the drive housing 7 at right angles to the longitudinal axis 27, engage(s) with each guide groove 45. In the illustrated embodiment, each guide groove 45 is assigned a plurality of guide elements 46 arranged in a row, which are capable of sliding or rolling along the guide groove 45. The guide elements 46 are preferably designed as rolling elements, in particular as spherical bodies as illustrated.

The guide elements 46 also belong to the linear guide means 6.

Opposite each guide groove 45 of the guide section 28, there is expediently provided a mating guide groove 47, which is stationary relative to the drive housing 7 and defines, together with the opposite guide groove 45, a guide passage which accommodates a plurality of guide elements 46. The mating guide grooves 47 are either integral with the drive housing 7 or preferably represented in each case by a separate guide rail 48, which is secured to the drive housing 7. The latter option applies to the illustrated embodiment.

When the output slide 4 performs a reciprocating movement, the guide elements 46 travel along the above-mentioned guide passages, rolling on the slide body 24 in the guide grooves 45. In this way, a smooth linear movement of the output slide 4 is ensured.

In principle, it is possible to produce the guide grooves 45 in the guide limbs 33, 34 exclusively by machining. It is, however, considerably more advantageous to produce the guide grooves 45, like in the illustrated embodiment, by a suitably contoured shaping of the guide limbs 33, 34 during the bending process of the slide body 24 or of the sheet metal blank 25. In other words, the two guide limbs 33, 34 are themselves bent in such a way that each has a cross-sectional contour which forms the associated at least one guide groove 45. This in particular results in an offset cross-sectional contour of the guide limbs 33, 34, which can be seen clearly in FIGS. 3 and 4, with the guide limbs 33, 34 having a raised area with a bead-type cross-section on the inside opposite the externally located guide groove 45. The material thickness of the guide limbs 33, 34 is expediently the same everywhere and expediently equal to the material thickness of the adjoining plate-shaped central section 32.

If a particularly precise guidance is desired, the guide grooves 45 can be ground and/or polished after the forming process. Very little material will be removed in this process, however, because the guide grooves 45 have already received their basic shape in the bending process.

In principle, the guide grooves 45 can be formed on the facing inner surfaces of the guide limbs 33, 34. If reworking by grinding is intended, in particular, the location of the guide grooves 45 on the outer surfaces of the guide limbs 33, 34 offers better access, however.

For the drive-coupling of the output slide 4 to the drive section 12, the single-piece slide body 24 is provided in the region of the front side 22 with an integrally formed drive limb 52, which projects downwards like the two guide limbs 33, 34. The drive limb 52 expediently projects beyond the front end face 13 of the drive housing 7. It also projects expediently beyond the front end face 13 of the drive section 12 protruding from the drive housing 7. This drive section 12 is, with the drive limb 52, secured to a mounting interface 53 formed on the drive limb 52, so that a driving force can be transmitted from the drive section 12 to the slide body 24 in both direction of the drive movement 14. In this way, the reciprocating movement 3 of the output slide 4 can be generated.

Like the two guide limbs 33, 34, the drive limb 52 is represented by a section of the slide body 24 which has been bent relative to the central section 32. The sections of the sheet metal blank 25 which have been bent to form the guide limbs 33, 34 and the drive limb 52 are indicated in FIG. 9 by the reference numbers 33*a*, 34*a* and 52*a*.

The linear drive 1 is preferably provided with a stroke limiting device 54 made up from a plurality of components, which is used to limit the reciprocating movement of the output slide 4 in its extension process and to define an extended position of the output slide 4.

The stroke limiting means 54 expediently comprise a stop limb 55, which is designed as a part of the single-piece slide body, is integrally located on the central section 32 at the rear end face 36 axially opposite the drive limb 52 and, like the drive limb 52 and the two guide limbs 33, 34, projects downwards from the central section 32. The stop limb 55 is produced by bending a section of the sheet metal blank 25 identified by the reference number 55*a* in FIG. 9 and is therefore represented by a section of the slide body 24 which has been bent relative to the central section 32.

The stop limb 55 expediently supports a stroke limiting element 56, which can act together with a mating stop 57 on the drive housing 7 for limiting the reciprocating movement and for presetting the extended position. The mating stop 57 projects into the traversing path of the stroke limiting element 56, so that the latter hits the mating stop 57 when the preset extended position of the output slide 4 is reached.

The stroke limiting element 56 is expediently provided with impact damping means 58, which damp the intensity of the impact on the mating stop 57. In the illustrated embodiment, the impact damping means 58 consist of a rubber buffer. Alternatively, they could be implemented as a fluidic shock absorber.

All of the limbs 33, 34, 52, 55 expediently extend in a plane perpendicular to the longitudinal axis 27 of the slide body 24. It is further advantageous if each of the limbs 33, 34, 52, 55 is bent relative to the central section 32 in such a way that a rounded transitional region 62 is generated.

Each of the bent limbs 33, 34, 52, 55 is preferably joined directly to the central section 32 only, in the illustrated embodiment by one of the rounded transitional regions 62. Between the various limbs 33, 34, 52, 55 themselves, there is expediently no material connection. This is reflected in the fact that each guide limb 33, 34 is separated both from the drive limb 52 and from the stop limb 55 by a separation slot 63 in the region of its lateral edges. The separation slots 63 are in particular designed such that they are open towards the bottom, i.e. on the side opposite the central section 32. The separation slots 63 preferably define a preferably gap-shaped free space between adjoining limbs 33, 34, 52, 55.

It is further advantageous if the central section 32, which preferably has a rectangular contour, has in its corner regions, where one of the guide limbs 33, 34 meets either the drive limb 52 or the stop limb 55, a recess 64 designed in the manner of a notch.

Each recess 64 expediently has two edge sections 64*a*, 64*b*, which preferably extend perpendicular to one another. One of these edge sections 64*a*, 64*b* merges into one of the guide limbs 33, 34, the other into the associated drive limb 52 or stop limb 55. All of the recesses 64 are open both towards the associated long side 37 and towards the associated end face 35 or 36 of the central section 32.

Each separation slot 63 expediently adjoins one of the recesses 64, the width of the separation slots 63 being less than that of the associated recess 64.

The stop limb 55 is preferably designed such that it is capable of linear movement within the guide recess 44.

The drive limb 52 expediently has a maximum width as measured in the axial direction of the transverse axis 38 which is greater than the width of the guide section 28. The drive limb 52 is preferably at least almost as wide as the drive housing 7.

In an advantageous design implemented in the illustrated embodiment, the drive limb 52 is bent into a U-shape, therefore being double-walled in a manner of speaking. The same applies to the stop limb 55 of the illustrated embodiment.

The drive limb 52 preferably has a first limb section 52*a*, which projects downwards from the central section 32 and which is adjoined at an angle of 180 degrees by a bent-back second limb section 52*b*, which projects upwards. Both limb sections 52*a*, 52*b* are preferably plate-shaped and expediently extend at least substantially in mutually parallel planes which are perpendicular to the longitudinal axis 27 in particular.

The stop limb 55 is expediently designed correspondingly, its first and second limb sections being identified by the reference numbers 55*a*, 55*b*.

The drive limb 52 and the stop limb 55 therefore have a U-shaped cross-sectional contour with the U-opening pointing upwards.

The drive limb 52 and/or the stop limb 55 is/are preferably bent in such a way that the downward-projecting first limb section 52*a*, 55*a* forms an outer limb section which is more distant from the guide section 28, while the upward-projecting second limb section 52b, 55b is closer to the guide section 28 and forms an inner limb section which flanks the outer limb section on the inside facing the guide section 28.

In principle, it would be possible to reverse the arrangement of the limb sections, so that the first limb section 52a, 55a forms an inner limb section and the second limb section 52b, 55b forms an outer limb section.

It is obviously also possible to make one or both of the limbs 52, 55 single-walled without any back-bending.

In the case of the drive limb 52, the double-walled configuration can in particular be used for an advantageous design of the mounting interface 53 for securing the drive section 12. This is implemented in the illustrated embodiment.

Figure 5:
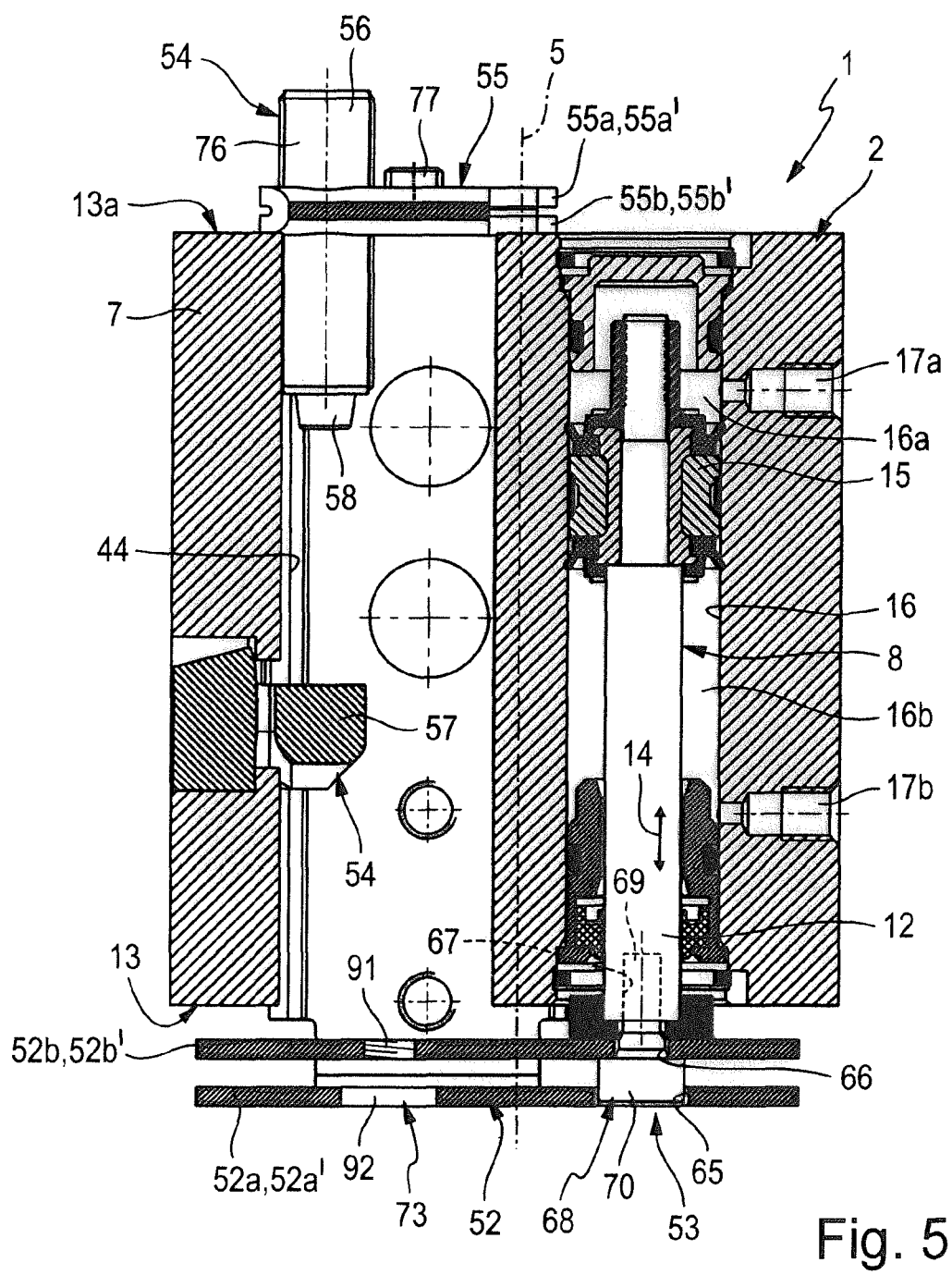
FIG. 5 is a longitudinal section through the linear drive along line of cut V-V from FIG. 1.
Figure 6:
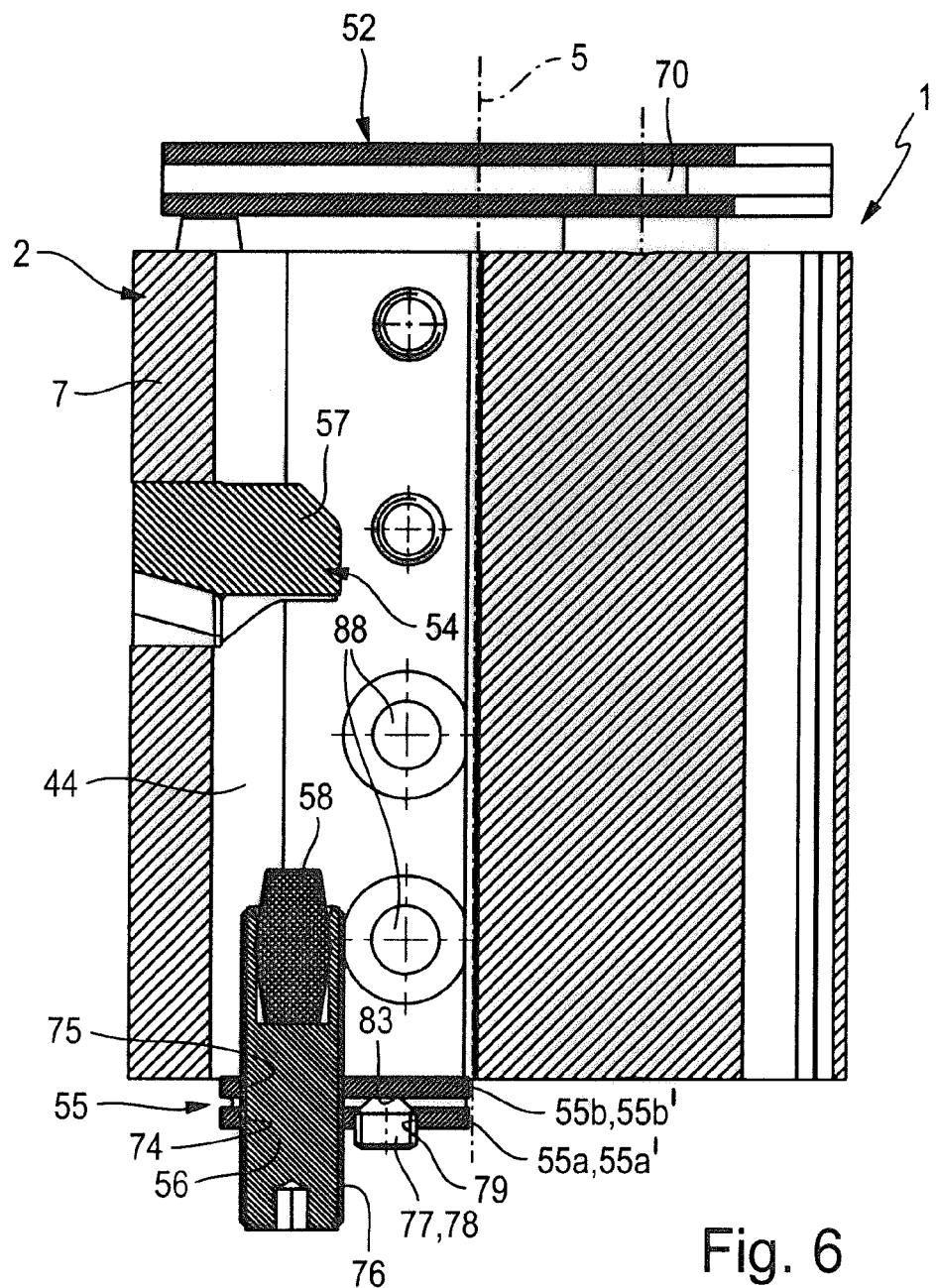
FIG. 6 is a further longitudinal section through the linear drive along the stepped line of cut VI-VI from FIG. 3.

As FIGS. 1 and 5 show particularly clearly, a first mounting hole 65, which is in alignment with a coaxial second mounting hole 66, which in the illustrated embodiment passes through the inner limb section 52b' represented by the second limb section 52b, passes through the outer limb section 52a', which is here represented by the first limb section 52a. Both mounting holes 65, 66 are in alignment with a threaded hole 67 in the end face of the drive section 12.

From the front of the slide body 24, a mounting screw 68 is inserted into the two mounting holes 65, 66, its threaded shank 69 passing through the second mounting hole 66 and being tightened into the threaded hole 67. The screw head 70 of the mounting screw 68 dips into the first mounting hole 65, which is dimensioned large enough to accommodate the screw head 70, its diameter substantially corresponding to the head diameter of the screw head 70.

The mounting screw 68 is tightened, the screw head 70 being supported on the outside of the inner limb section 52b', clamping it to the drive section 12. At the same time, the screw head 70 is recessed in the interior of the drive limb 52, because the distance between the two limb sections 52a', 52b' is chosen such that the screw head 70 does not project beyond the outer surface of the outer limb section 52a', which is opposite the inner limb section 52b'. In this way, a smooth outer surface of the drive limb 52 can be obtained.

The slide body 24 is provided with at least one mounting interface 73 for securing an object to be moved by the output slide 4. Such a mounting interface 73 is, for example, represented by a threaded hole. In the illustrated embodiment, the slide body 24 is provided with at least one such mounting interface 73 in the region of the central section 32. In addition or alternatively, the drive limb 52, in particular, can also be provided with at least one such mounting interface 73.

The double-walled configuration of the drive limb 52 with its two limb sections 52a, 52b can be used to particular advantage for the integration of at least one mounting interface 73, as shown by way of example in FIG. 5 only. In such a case, one or more mounting interfaces 73 each consist of a threaded hole 91 formed in the inner limb section 52b' and a coaxial through-hole 92, which is preferably not threaded, in the outer limb section 52a'. The through-hole 92 expediently has a larger diameter than the threaded hole 91 and can be used as a centring hole for positioning an object to be located, which can be inserted into the through-hole 92. With the aid of the threaded hole 91, this object can be securely bolted to the drive limb 52.

The object to be secured can in particular have a centring section the outer diameter of which corresponds to the inner diameter of the through-hole 92 and which is adjoined by a stud bolt, and the object is inserted from the outside into the through-hole 92 and tightened with the leading stud bolt into the threaded hole 91 until the centring section dips into the through-hole 92 acting as a centring hole and is expediently supported on the surface of the inner limb section 52b', which faces the outer limb section 52a' and surrounds the threaded hole 91.

In the stop limb 55, the double walled configuration with its two limb sections 55a, 55b is preferably used to secure the stroke limiting element 56 in position.

In this context, a threaded mounting hole 74, 75 with a female thread passes through each of the two limb sections 55a, 55b, the two threaded mounting holes 74, 75 having the same diameter and being aligned coaxially. The stroke limiting element 56, which expediently has an at least partially circular cylindrical outer circumference, is provided with a male thread 76, which is tightened into the two threaded mounting holes 74, 75 in such a way that it extends simultaneously through both of the threaded mounting holes 74, 75.

By turning, the stroke limiting element 56 can be axially adjusted in the two threaded mounting holes 74, 75 for setting a desired stroke limiting position.

When the desired stroke limiting position is reached, the stroke limiting element 56 can be clamped to the stop limb 55, resulting in a non-positive security against rotation. This can be obtained by providing that the two limb sections 55a, 55b can be spread apart by means of a spreading element 77 in such a way that the female threads of the two threaded mounting holes 74, 75 are clamped to the male thread 76 of the stroke limiting element 56. The groove sides of the two female threads are clamped to the groove sides of the male thread 76 in the axial direction the stroke limiting element 56 in opposite directions in such a way that a frictional force is generated to prevent an undesirable rotation of the stroke limiting element 56.

The spreading element 77 is preferably represented by a screw, as is the case in the illustrated embodiment. This screw, which in view of its function is described as spreading screw 78, is tightened in an axially accessible manner into a further threaded hole 79 in the outer limb section 55a' of the stop limb 55, this being preferably represented by the first limb section 55a. Opposite this further threaded hole 79, there is a surface section 83 of the adjacent inner limb section 55b' of the stop limb 55, which is preferably represented by the second limb section 55b. The spreading screw 78 can, by turning relative to the outer limb section 55a', be moved towards the inner limb section 55b', biasing the two limb sections 55a', 55b' away from each other, whereby the spreading apart and the mutual clamping of the threads of the threaded mounting holes 74, 75 as described above can be obtained.

The two limb sections 52a, 52b; 55a, 55b of the drive limb 52 and/or of the stop limb 55 are expediently arranged at a distance from each other, resulting in a gap-shaped space between them. For this purpose, it is sufficient if the respective limb 52, 55 is bent in a back-bend region 84 by 180 degrees in such a way that the back-bend region 84 has a rounded U-shaped curvature. Though this would be possible in principle, there is no need for then pushing together the flanking limb sections 52a, 52b; 55a, 55b.

The drive limb 52 and/or the stop limb 55 expediently adjoin(s) the central section 32 with a limb base section 85, which has a smaller width than the central section 32. The deformation section 86, which is subjected to a bending process to generate the bent drive limb 52 and/or stop limb 55, is expediently a part of the limb base section 85. The limb base section 85 of the drive limb 52 and/or the stop limb 55 is expediently adjoined by a limb main section 89, which is wider in the axial direction of the transverse axis 38 and which comprises the two preferably provided limb sections 52a, 52b' 55a, 55b.

In a preferred method for producing the linear drive 1, the slide body 24 is, starting with a plate-shaped sheet metal blank 25, bent into the desired shape. The mounting interfaces 73 are expediently produced before this bending process, for example by stamping followed by thread cutting. In the same context, further holes 87 can, if required, be produced; these pass through the central section 32 and facilitate access to the mounting holes 88 passing through the drive housing 7 in the region below the central section 32.

At the edges, i.e. at its external contour, the sheet metal blank 25 is trimmed or contoured in such a way that the bent sheet metal part forming the slide body 24 does not require any trimming of the edges after the bending process. The sheet metal blank 25 can therefore virtually immediately be a bending blank from which the slide body 24 can then be produced exclusively by bending. In this bending process, the tab-type sections 52a, 33a, 34a, 55a are bent to the desired shape. The two sections 52a, 55a, from which the drive limb 52 and the stop limb 55 are produced, are expediently bent about 180 degrees in the back-bend region 84 to produce the two limb sections 52a, 52b; 55a, 55b, before the drive limb 52 and/or the stop limb 55 is/are then bent downwards as a whole.

The invention claimed is:

1. A linear drive comprising a drive unit having a drive housing and comprising an output slide which is located on the outside of the drive housing and guided for linear movement relative thereto to perform a reciprocating movement oriented in the axial direction of a longitudinal axis, wherein the output slide comprises a single-piece slide body having a guide section with a U-shaped cross-section and having a plate-shaped central section and guide limbs arranged at opposite long sides of the central section and projecting downwards towards the drive housing, and having a drive limb arranged at an end face of the central section and likewise projecting downwards, wherein the guide limbs are used for the linear guidance of the output slide and the drive limb is drive-coupled to at least one drive section of the drive unit, which projects out from the drive housing, wherein the single-piece slide body is a bent sheet metal part, wherein both the guide limbs and the drive limb are formed as respective bent sections of the single-piece slide body which are bent relative to the central section such that the guide limbs, the drive limb and the central section are one integral piece.

2. A linear drive according to claim 1, wherein each of the two guide limbs is provided with at least one linear guide groove extending in the axial direction of the longitudinal axis, with which engages at least one guide element supporting the output slide relative to the drive housing at right angles to the longitudinal axis.

3. A linear drive according to claim 2, wherein the two guide limbs are directly bent in themselves in such a way that they have a cross-sectional contour which forms the respective associated at least one guide groove.

4. A linear drive according to claim 2, wherein the at least one guide groove is located on the outside of the respective guide limb facing away from the respective other guide limb.

5. A linear drive according to claim 1, wherein the drive limb is separated from each guide limb by a separation slot, which is open on the underside opposite the central section.

6. A linear drive according to claim 1, wherein the central section has in each of its two edge regions, where the drive limb is adjacent to the two guide limbs, a recess designed in the manner of a notch.

7. A linear drive according to claim 1, wherein the drive limb is bent to a U-shape and has, starting from the central section, a downward-projecting first limb section adjoined by a second limb section bent back by about 180 degrees and projecting upwards.

8. A linear drive comprising a drive unit having a drive housing and comprising an output slide which is located on the outside of the drive housing and guided for linear movement relative thereto to perform a reciprocating movement oriented in the axial direction of a longitudinal axis, wherein the output slide comprises a single-piece slide body having a guide section with a U-shaped cross-section and having a plate-shaped central section and guide limbs arranged at opposite long sides of the central section and projecting downwards towards the drive housing, and having a drive limb arranged at an end face of the central section and likewise projecting downwards, wherein the guide limbs are used for the linear guidance of the output slide and the drive limb is drive-coupled to at least one drive section of the drive unit, which projects out from the drive housing, wherein the single-piece slide body is a bent sheet metal part, wherein both the guide limbs and the drive limb are represented by sections of the slide body which are bent relative to the central section, and wherein the drive limb is bent to a U-shape and has, starting from the central section, a downward-projecting first limb section adjoined by a second limb section bent back by about 180 degrees and projecting upwards, and wherein each of the two limb sections of the drive limb has a mounting hole passing through it, the mounting holes being coaxial with each other, the outer mounting hole formed in the outer limb section of the two limb sections, which is more distant from the guide section, having a larger diameter than the inner mounting hole formed in the inner limb section represented by the other of the two limb sections, wherein the threaded shank of a mounting screw, by which the drive limb is bolted to the drive section and the screw head of which dips into the outer mounting hole, passes through the inner mounting hole.

9. A linear drive according to claim 1, wherein the single-piece slide body has, at that end face of the central section which is opposite the drive limb, a likewise downward-projecting stop limb, which is represented by a section of the slide body bent downwards relative to the central section and which is used for limiting the reciprocating movement of the output slide.

10. A linear drive comprising a drive unit having a drive housing and comprising an output slide which is located on the outside of the drive housing and guided for linear movement relative thereto to perform a reciprocating movement oriented in the axial direction of a longitudinal axis, wherein the output slide comprises a single-piece slide body having a guide section with a U-shaped cross-section and having a plate-shaped central section and guide limbs arranged at opposite long sides of the central section and projecting downwards towards the drive housing, and having a drive limb arranged at an end face of the central section and likewise projecting downwards, wherein the guide limbs are used for the linear guidance of the output slide and the drive limb is drive-coupled to at least one drive section of the drive unit, which projects out from the drive housing, wherein the single-piece slide body is a bent sheet metal part, wherein both the guide limbs and the drive limb are represented by sections of the slide body which are bent relative to the central section, and wherein the single-piece slide body has, at that end face of the central section which is opposite the drive limb, a likewise downward-projecting stop limb, which is represented by a section of the slide body bent downwards relative to the central section and which is used for limiting the reciprocating movement of the output slide, and wherein the stop limb is separated from each guide limb by a separation slot, which is open on the underside opposite the central section and which is designed such that a free space extends between the stop limb and each guide limb.

11. A linear drive according to claim 9, wherein the central section has in each of its two edge regions where the stop limb is adjacent to the two guide limbs a recess designed in the manner of a notch.

12. A linear drive comprising a drive unit having a drive housing and comprising an output slide which is located on the outside of the drive housing and guided for linear movement relative thereto to perform a reciprocating movement oriented in the axial direction of a longitudinal axis, wherein the output slide comprises a single-piece slide body having a guide section with a U-shaped cross-section and having a plate-shaped central section and guide limbs arranged at opposite long sides of the central section and projecting downwards towards the drive housing, and having a drive limb arranged at an end face of the central section and likewise projecting downwards, wherein the guide limbs are used for the linear guidance of the output slide and the drive limb is drive-coupled to at least one drive section of the drive unit, which projects out from the drive housing, wherein the single-piece slide body is a bent sheet metal part, wherein both the guide limbs and the drive limb are represented by sections of the slide body which are bent relative to the central section, and wherein the single-piece slide body has, at that end face of the central section which is opposite the drive limb, a likewise downward-projecting stop limb, which is represented by a section of the slide body bent downwards relative to the central section and which is used for limiting the reciprocating movement of the output slide, and wherein the stop limb supports a stroke limiting element, which can act together with a mating stop on the drive housing to limit the reciprocating movement of the output slide and which is expediently provided with impact damping means.

13. A linear drive according to claim 9, wherein the stop limb is bent to a U-shape and has, starting from the central section, a downward-projecting first limb section adjoined by a second limb section bent back by about 180 degrees and projecting upwards.

14. A linear drive comprising a drive unit having a drive housing and comprising an output slide which is located on the outside of the drive housing and guided for linear movement relative thereto to perform a reciprocating movement oriented in the axial direction of a longitudinal axis, wherein the output slide comprises a single-piece slide body having a guide section with a U-shaped cross-section and having a plate-shaped central section and guide limbs arranged at opposite long sides of the central section and projecting downwards towards the drive housing, and having a drive limb arranged at an end face of the central section and likewise projecting downwards, wherein the guide limbs are used for the linear guidance of the output slide and the drive limb is drive-coupled to at least one drive section of the drive unit, which projects out from the drive housing, wherein the single-piece slide body is a bent sheet metal part, wherein both the guide limbs and the drive limb are represented by sections of the slide body which are bent relative to the central section, and wherein the single-piece slide body has, at that end face of the central section which is opposite the drive limb, a likewise downward-projecting stop limb, which is represented by a section of the slide body bent downwards relative to the central section and which is used for limiting the reciprocating movement of the output slide, and wherein the stop limb is bent to a U-shape and has, starting from the central section, a downward-projecting first limb section adjoined by a second limb section bent back by about 180 degrees and projecting upwards, and wherein each of the two limb sections of the stop limb has a mounting hole with a female thread passing through it, the threaded mounting holes being coaxial with each other, and wherein a stroke limiting element with a male thread, which is used for limiting the reciprocating movement of the output slide, is or can be tightened into these threaded mounting holes in such a way that it passes through both threaded mounting holes simultaneously, and wherein the linear drive comprises a spreading element, by means of which the two limb sections of the stop limb can be spread apart in such a way that the female threads of the mounting holes are clamped to the male thread of the stroke limiting element to secure the stroke limiting element against rotation.

15. A linear drive according to claim 14, wherein the spreading element is a spreading screw, which can be screwed into a threaded hole of the one limb section which is separate from the threaded mounting holes, and which can be clamped against an opposite surface section of the other limb section in order to spread the two limb sections apart.

16. A linear drive according to claim 15, wherein the slide body is made of sheet steel.

17. A method for producing a linear drive comprising a drive unit having a drive housing and comprising an output slide which is located on the outside of the drive housing and guided for linear movement relative thereto to perform a reciprocating movement oriented in the axial direction of a longitudinal axis, wherein the output slide comprises a single-piece slide body having a guide section with a U-shaped cross-section and consisting of a plate-shaped central section and of guide limbs arranged at opposite long sides of the central section and projecting downwards towards the drive housing, and having a drive limb arranged at an end face of the central section and likewise projecting downwards, wherein the guide limbs are used for the linear guidance of the output slide and the drive limb is drive-coupled to at least one drive section of the drive unit, which projects out from the drive housing, wherein the single-piece slide body is produced in a bending process as a bent sheet metal part based on a plate-shaped sheet metal blank, which has previously been suitably contoured at the edges, wherein the bending process comprises:

bending opposite sections of the plate-shaped sheet metal blank with respect to the central section to form the guide limbs; and bending a guide limb section of the plate-shaped sheet metal blank with respect to the central section to form the guide limb, whereby the guide limbs, the drive limb and the central section are one integral piece.

18. A linear drive according to claim 2, wherein the at least one guide element is designed as a rolling element.

19. A linear drive according to claim 2, wherein a plurality of guide elements is simultaneously engaging with the guide groove.

20. A linear drive according to claim 5, wherein the separation slot is designed such that a free space extends between the drive limb and each guide limb.

21. A linear drive according to claim 7, wherein the second limb section of the drive limb flanks the first limb section of the drive limb on its inside facing the guide section.

22. A linear drive according to claim 8, wherein the distance between the two limb sections is chosen such that the screw head does not project beyond the outer surface of the outer limb section which is opposite the inner limb section.

23. A linear drive according to claim 10, wherein the separation slot is designed such that a free space extends between the stop limb and each guide limb.

24. A linear drive according to claim 12, wherein the stroke limiting element is provided with impact damping means.

25. A linear drive according to claim 13, wherein the second limb section of the stop limb flanks the first limb section of the stop limb on its inside facing the guide section.

* * * * *